United States Patent
Yang et al.

(10) Patent No.: US 9,681,455 B2
(45) Date of Patent: Jun. 13, 2017

(54) METHODS FOR REDUCING INTERFERENCE IN A COMMUNICATION SYSTEM

(75) Inventors: Kai Yang, Princeton, NJ (US);
Chan-Byoung Chae, Jersey City, NJ (US); Doru Calin, Manalapan, NJ (US); Denis Rouffet, Boulogne-Billancourt (FR); Simon Yiu, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1176 days.

(21) Appl. No.: 13/010,262

(22) Filed: Jan. 20, 2011

(65) Prior Publication Data
US 2011/0183623 A1    Jul. 28, 2011

Related U.S. Application Data

(60) Provisional application No. 61/299,195, filed on Jan. 28, 2010.

(51) Int. Cl.
*H04B 1/00* (2006.01)
*H04W 72/08* (2009.01)
(Continued)

(52) U.S. Cl.
CPC ........ *H04W 72/082* (2013.01); *H04B 7/0408* (2013.01); *H04W 16/28* (2013.01); *H04W 16/30* (2013.01); *H04W 72/046* (2013.01)

(58) Field of Classification Search
None
See application file for complete search history.

(56) References Cited

U.S. PATENT DOCUMENTS 6,421,809 B1 *   7/2002   Wuytack .................. G06F 8/433
                                                716/132
6,813,254 B1 *  11/2004   Mujtaba .................. H04L 5/143
                                                370/335
(Continued)

FOREIGN PATENT DOCUMENTS

EP           0201254 A2      11/1986
EP           0841827 A2       5/1998
(Continued)

OTHER PUBLICATIONS

Marc C. Necker "Local Interference Coordination in Cellular OFDMA Networks", Vehicular Technology Conference, 2007. VTC-2007 Fall. 2007 IEEE 66th, IEEE, PI, Sep. 1, 2007, pp. 1741-1746, XP031147706, ISBN: 978-1-4244-0263-2.

(Continued)

*Primary Examiner* — Mohammed Rachedine
(74) *Attorney, Agent, or Firm* — Harness, Dickey & Pierce, P.L.C.

(57) ABSTRACT

Example embodiments are directed to methods of reducing interference in a communication system. In at least one example embodiment, a method includes first determining, by a first transmitter having a multi-directional antenna configured to produce a plurality of beams, at least one interference level of at least one interfering beam of a plurality of beams of at least one transmitter in the communication system, second determining a transmitting beam pattern based on the interference level, the transmitting beam pattern indicating a sequence of illuminating the plurality of beams at corresponding time slots, third determining a fractional frequency reuse pattern based on the transmitting beam pattern, and transmitting data based on the transmitting beam pattern and the frequency reuse pattern.

12 Claims, 10 Drawing Sheets

(51) Int. Cl.
*H04B 7/0408* (2017.01)
*H04W 16/28* (2009.01)
*H04W 16/30* (2009.01)
*H04W 72/04* (2009.01)

(56) References Cited

U.S. PATENT DOCUMENTS

| | | | | |
|---|---|---|---|---|
| 7,990,997 | B2* | 8/2011 | Wang | H04W 74/08 340/10.1 |
| 2006/0217158 | A1 | 9/2006 | Uwano et al. | |
| 2008/0175199 | A1* | 7/2008 | Shao | H04W 28/26 370/329 |
| 2008/0297413 | A1* | 12/2008 | Kokku | H04B 7/0408 342/367 |
| 2009/0131057 | A1* | 5/2009 | Dimou | H04W 16/02 455/436 |
| 2010/0214169 | A1* | 8/2010 | Kafle | H01Q 3/26 342/368 |
| 2010/0246524 | A1 | 9/2010 | Hou et al. | |
| 2011/0228798 | A1* | 9/2011 | Oh | H04W 16/02 370/468 |

FOREIGN PATENT DOCUMENTS

| | | | |
|---|---|---|---|
| EP | 2 028 891 | 2/2009 | |
| EP | 2 148 546 | 1/2010 | |
| FR | EP 2148546 A1 * | 1/2010 | H04W 72/1231 |
| JP | 2006270216 A | 10/2006 | |
| JP | 2010246113 A | 10/2010 | |
| WO | WO 2008/055132 | 5/2008 | |

OTHER PUBLICATIONS

International Search Report and Written Opinion dated Apr. 4, 2011.
Ericsson, "Schedule single vs. multiple beams per fram for E-UTRA", 3GPP TSG RAN WG1 Meeting #46, Tallin, Estonia, Aug. 28-Sep. 1, 2006, whole document.
Ericsson, "Inter-cell Interference Handling for E-UTRA" TSG-RAN WG1 #42, London, UK, Aug. 29-Sep. 2, 2005, whole document.
Stephan Saur, et al., "Grid-of-Beans (GoB) Based Downlink Multi-User MIMO" IEEE 802.16 Broadband Wireless Access Working Group, May 5, 2008, whole document.
LG Electronics, "Interference mitigation in evolved UTRA/UTRAN" 3GPP TSG RAN WG1 #42, London, England, Aug. 29-Sep. 2, 2005, whole document.
Kamal Jain et al., "Impact of Interference on Multi-hop Wireless Network Performance" ACM MOBICOM, Sep. 2003, pp. 66=80.
Lingjia Liu et al., "Multi-cell MIMO schemes for IEEE 802.16m" IEEE 802.16 Broadband Wireless Access Working Group, Jul. 7, 2008, whole document.
Nokia, "Considerations on DL MIMO for LTE-Advanced" 3GPP TSG RAN WG1 Meeting #55, Prague, Czech Republic, Nov. 10-14, 2008, whole document.

* cited by examiner

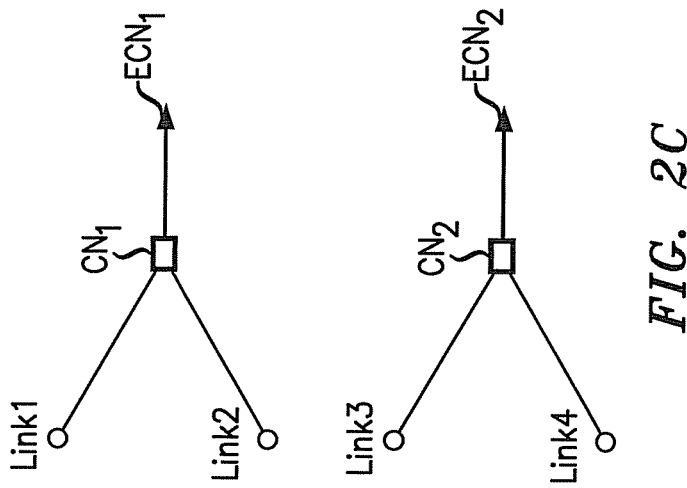
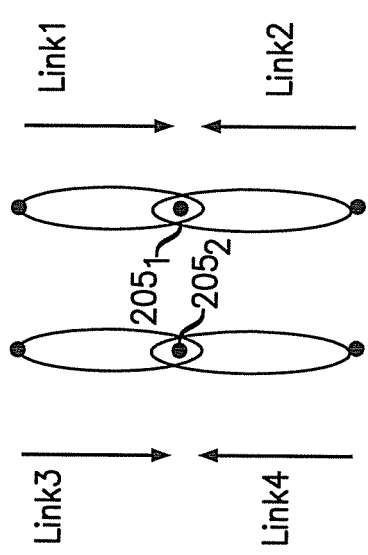
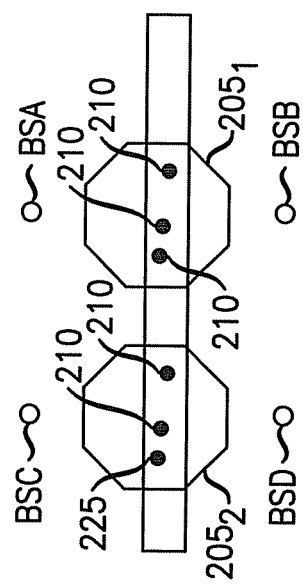
FIG. 2A
FIG. 2B
FIG. 2C

METHODS FOR REDUCING INTERFERENCE IN A COMMUNICATION SYSTEM

PRIORITY STATEMENT

This application claims the benefit of U.S. Provisional Application No. 61/299,195, filed Jan. 28, 2010, the entire contents of which are hereby incorporated by reference.

BACKGROUND

Due to a rich scattering environment of wireless channels in indoor high data rate wireless systems, decreased cell size and distances between nearby base stations (BSs), different transmitter-receiver pairs may generate strong interferences against each other. The strong interferences may severely limit the performance of the wireless system.

The wireless interference is more difficult to deal with the rich scattering environment such as outdoor-to-indoor or indoor environments. The difficulty is due to scattering and a transmitted signal being reflected in multiple directions, which in turn, may increase the interference and significantly degrade the wireless system performance (e.g., spectrum efficiency, system/user throughputs).

Fractional Frequency Reuse (FFR) and beam switching are two different methods used to suppress wireless interferences. However, for outdoor-to-indoor or indoor-to-indoor transmission, the gain obtained by coordinated beam forming from beam switching can be significantly degraded by the rich scattering nature of the radio channels. FFR has been widely used in macro cellular systems, and it can also be used for indoor deployments. Although FFR mitigates interferences, FFR also results in lower spectrum efficiency due to a small frequency reuse factor.

SUMMARY

Example embodiments are directed to methods of reducing interference in a communication system. More specifically, conflict graphs may be used by base stations in joint beam switching and FFR techniques to mitigate interference between adjacent/nearby base stations.

In at least one example embodiment, a method includes first determining, by a first transmitter having a multi-directional antenna configured to produce a plurality of beams, at least one interference level of at least one interfering beam of a plurality of beams of at least one transmitter in the communication system, second determining a transmitting beam pattern based on the interference level, the transmitting beam pattern indicating a sequence of illuminating the plurality of beams at corresponding time slots, third determining a fractional frequency reuse pattern based on the transmitting beam pattern, and transmitting data based on the transmitting beam pattern and the frequency reuse pattern.

BRIEF DESCRIPTION OF THE DRAWINGS

Example embodiments will be more clearly understood from the following detailed description taken in conjunction with the accompanying drawings. FIGS. 1-5 represent non-limiting, example embodiments as described herein.

FIGS. 2A-2C illustrate an example embodiment of a method for constructing an extended conflict graph of a wireless system;

FIG. 5 illustrates a transmitter included in a base station according to an example embodiment.

DETAILED DESCRIPTION

Figure 1A:
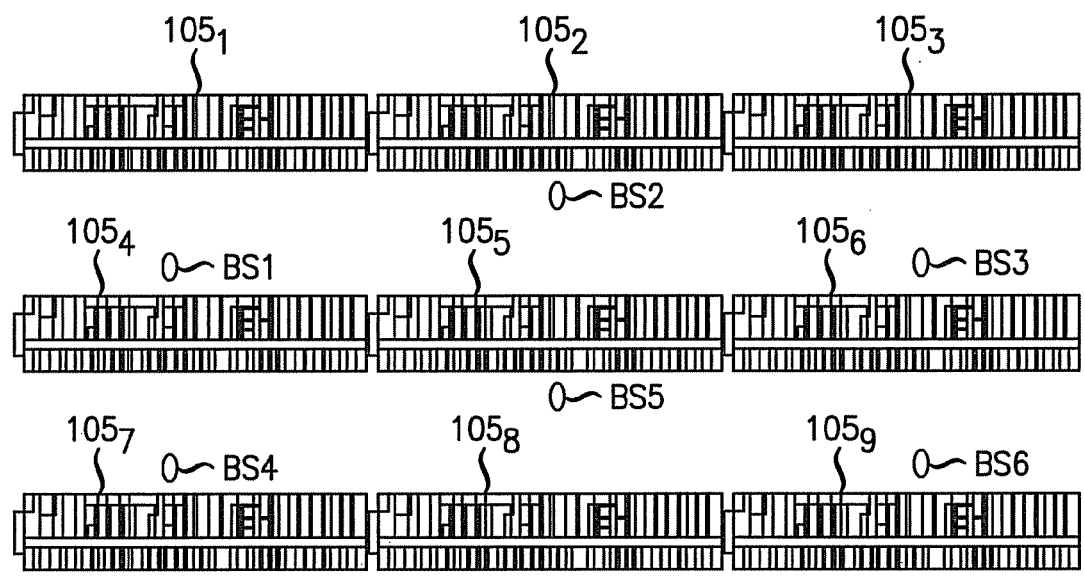
FIG. 1A illustrates a wireless system according to an example embodiment.

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing system elements or control nodes (e.g., a scheduler located at a cell site, base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

As used herein, the term "user equipment" (UE) may be synonymous to a mobile user, mobile station, mobile terminal, user, subscriber, wireless terminal and/or remote station and may describe a remote user of wireless resources in a wireless communication system. The term "base station" may be understood as a one or more cell sites, base stations, access points, and/or any terminus of radio frequency communication. Although current system architectures may consider a distinction between mobile/user devices and access points/cell sites, the example embodiments described hereafter may generally be applicable to architectures where that distinction is not so clear, such as ad hoc and/or mesh system architectures, for example.

FIG. 1A illustrates a wireless system according to an example embodiment. As shown in FIG. 1A, six base stations (BS) BS1-BS6 are deployed to provide wireless coverage for multiple floors of nine buildings 1051-1059. While six base stations and nine buildings are illustrated, it should be understood that example embodiments are not limited thereto. Example embodiments may be implemented with more or less than six base stations and/or nine buildings.

The relative locations of the base stations BS1-BS6 are determined according to parameters such as feedback from UEs. Methods used to determine locations of the base stations BS1-BS6 are well known and any known method may be used to determine the locations of the base stations BS1-BS6. Thus, for the sake of clarity and brevity, a further description will not be provided.

Figure 1B:
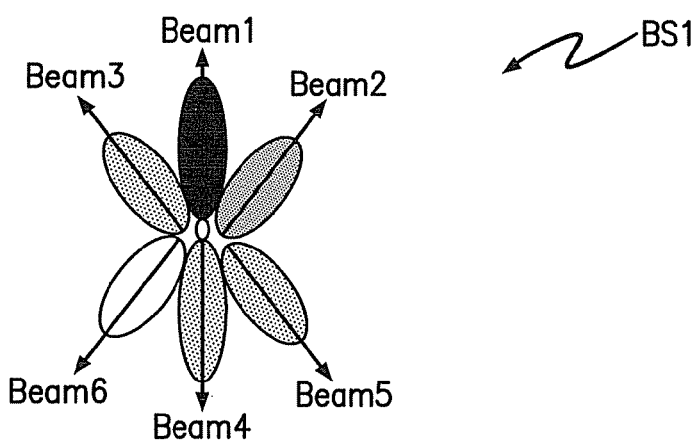
FIG. 1B illustrates an example embodiment of beams associated with a base station shown in FIG. 1A.

Each base station BS1-BS6 is equipped with a smart antenna which can form beams toward any given direction. FIG. 1B illustrates an example embodiment of the base station BS1 with a smart antenna configured to form beams Beam1-Beam6 toward six directions, respectively. While only the base station BS1 is shown in FIG. 1B, the base stations BS2-BS6 have the same or similar smart antennas. Moreover, while the base station BS1 is illustrated as forming six beams Beam1-Beam6 toward six directions, respectively, it should be understood that more or less than six directions may be implemented in example embodiments. Provided below is an example of transmitting angles for the beams Beam1-Beam6.

| Beam | Angle |
|---|---|
| Beam1 | 270 |
| Beam2 | 210 |
| Beam3 | 330 |
| Beam4 | 90 |
| Beam5 | 30 |
| Beam6 | 150 |

Figure 1C:
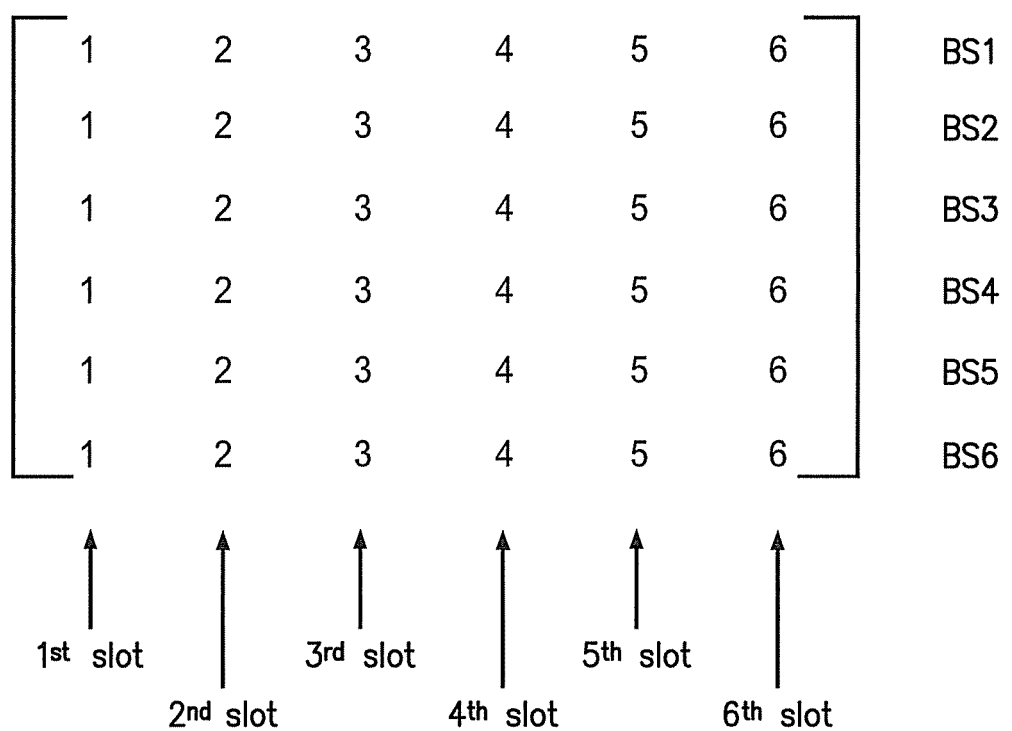
FIG. 1C illustrates a conventional beam switching pattern matrix for the wireless system illustrated in FIG. 1A.

FIG. 1C illustrates a conventional beam switching pattern matrix for the wireless system illustrated in FIG. 1A.

A matrix element $B_{ij}$ represents a beam index of an i base station at a j time slot. For example, the first row indicates that the base station BS1 illuminates beams Beam1, Beam2, Beam3, Beam4, Beam5 and Beam6 at $1^{st}$, $2^{nd}$, $3^{rd}$, $4^{th}$, $5^{th}$ and $6^{th}$ time slots, respectively. The sequence is repeated in the same order in the subsequent time slots. However, the conventional beam switching pattern matrix shown in FIG. 1C may result in nearby base stations illuminating beams that interfere with each other. Moreover, conventional beam switching patterns may lead to strong interference between nearby BSs.

In example embodiments, a conflict-graph based joint beam switching and FFR approach is used to mitigate interference between nearby base stations (e.g., BS1-BS6) in rich scattering environments, in particular for outdoor-to-indoor and indoor-to-indoor wireless communications.

Adjacent BSs and nearby BSs may refer to BSs that are physically close to each other and may be subject to strong interference. One example of strong interference is when a UE receives an equally strong signal from two nearby BSs. Since the UE is only attached to one BS, the signal from the other BS is interference. In this example, the signal-to-interference plus noise ratio (SINR) will be below 0 dB which make the UE unable to recover information from the attached BS.

A BS may determine a nearby BS based on feedback from a UE.

Beam switching and FFR across BSs are performed subject to mutual interference effects. Each BS is characterized by a beam switching/frequency band sequence; this is the sequence of beams which are illuminated by the base station antenna at different time instances. This beam sequence is expected to be repetitive in time.

In some example embodiments, by exchanging the beam switching sequences among a group of nearby BSs, the beam switching can be performed in a coordinated manner, mitigating the interference. FFR is used in conjunction with the beam switching method to further suppress the interference. Also, in a dynamically changing environment, adaptive algorithms are used by nearby BSs to carry out the coordinated beam switching and FFR based on the information collected by monitoring the environment, e.g., number of active users, users' location, channel quality, and traffic conditions.

In other words, each beam is associated with a sequence of 0-1 indicating variables indexed by different time slots. The value of the indicating variable at a particular time slot determines whether the beam is illuminated or not by the base station, e.g., if the variable is 0 then the corresponding beam is activated, otherwise the beam is turned off.

Example embodiments also apply where multiple beams pertaining to a BS are simultaneously active and each beam can be associated with a frequency band. For instance, instead of using a duty cycle to repeat a beam sequence, a BS can illuminate N beams simultaneously and assign a specific frequency band to each beam.

FIGS. 2A-2C illustrate an example embodiment of a method for constructing a conflict graph a wireless system (e.g. a small cell system).

As shown in FIG. 2A, four BSs BSA-BSD are used to serve two clusters $205_1$-$205_2$ of UEs 210. Each base station BSA-BSD may be the same as the base station BS1, thus, a further description will be omitted for the sake of brevity.

The wireless system can be modeled by two base stations (e.g., BSA and BSD) as four wireless links Link1-Link4 connecting each base station BSA-BSD to corresponding UEs 210, as shown in FIG. 2B. Each link Link1-Link4 represents a transmitter and receiver pair.

Due to the frequency reuse nature of a wireless channel, different wireless links may generate strong interference against each other. In the example shown in FIG. 2B, the links Link1 and Link2 are subject to strong mutual interference, while there is no strong interference between links Link1 and Link3 or between the links Link1 and Link4.

The conflicts between the wireless links Link1-Link4 are captured in a conflict graph shown in FIG. 2C. The conflict graph is a bi-partite graph, in which each wireless link Link1-Link4 in the wireless system is represented by a node on the left hand side, termed as a variable node. The constraints between the different links Link1-Link4 are represented by a group of nodes $CN_1$-$CN_2$ on the right hand side, termed as constraint nodes. As shown, two variable nodes are connected to a constraint node if the corresponding wireless links are conflicting with each other, i.e., strongly interfering with each other if no FFR is used.

For example, the variable nodes representing the links Link1 and Link2 are connected to a constraint node $CN_1$ because the links Link1 and Link2 conflict with each other. If two links are connected to a constraint node, then only one link is generated in a time slot or FFR is used. For example, the links Link1 and Link2 are generated at different time slots or at different frequencies because they are connected to the constraint node $CN_1$.

To determine whether different links Link1-Link4 are connected to a conflict node $CN_1$-$CN_2$, each base station BSA-BSD is configured to, carry out local measurements (e.g., signal to noise and interference ratio (SINR)) and/or exchange information with nearby base stations based on a decentralized algorithm to generate the model shown in FIG. 2B and the complete extended conflict graph shown in FIG. 2C, as will be described in greater detail with reference to FIG. 3. This leads to less overhead in the wireless system.

Each base station BSA-BSD stores a local extended conflict graph, which is a part of a complete extended conflict graph of the wireless system. A local extended conflict graph is a sub-graph of the complete extended conflict graph consisting of a portion of the nodes and edges of the complete extended conflict graph. A complete extended conflict graph consists of many nodes and edges connected, as shown in FIG. 2C.

Each base station BSA-BSD generates its local extended conflict graph based on the measurements (feedback from UE) as well as information messages received from the nearby other BSs in the wireless system. Alternatively, a master controller may collect information from all BSs then generate the complete extended conflict graph and send each BS its corresponding local extended conflict graph.

The constraint nodes $CN_1$-$CN_2$ can be threshold levels for interference. Based on the measurement information, the base stations BSA-BSD are configured to determine which links Link1-Link4 are connected to the constraint nodes $CN_1$-$CN_2$. For example, if an interference level between the links Link1 and Link2 exceed an interference threshold, the links Link1 and Link2 are connected to a constraint node (e.g., $CN_1$).

An extended conflict node $ECN_1$-$ECN_2$ is connected to each constraint node $CN_1$-$CN_2$. Each extended constraint node $ECN_1$-$ECN_2$ represents possible FFR to solve the conflict between beams.

FIGS. 3A-3D illustrate a method of reducing interference and generating a conflict graph according to an example embodiment. FIGS. 4A-4D illustrate a wireless system configured to implement the method of FIGS. 3A-3D.

Figure 3A:
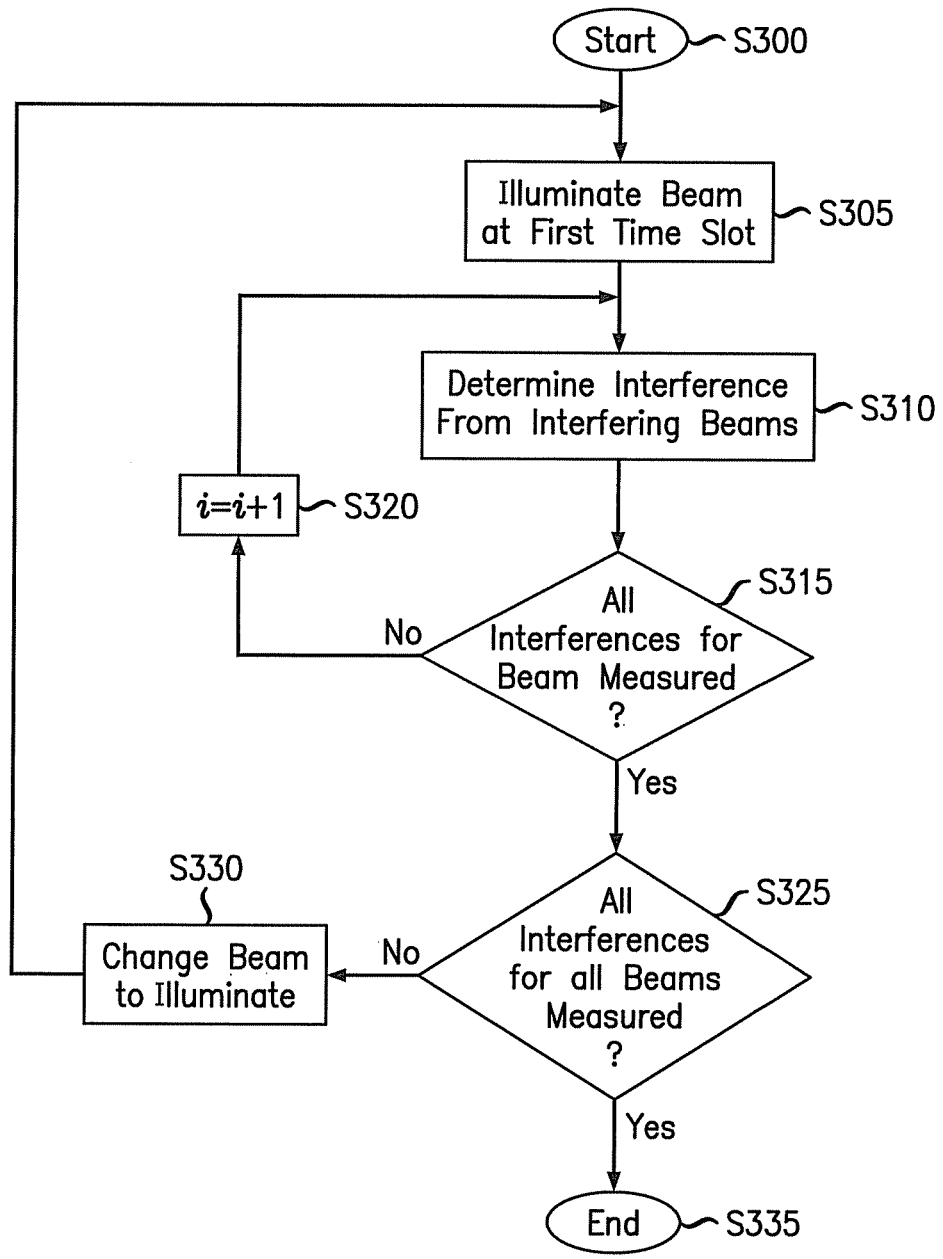
FIG. 3A illustrates a method determining interference levels according to an example embodiment.

FIG. 3A illustrates a method of initialization and, more specifically, a method of determining interference levels with nearby base stations. At S300, a BS begins the method. The method shown in FIG. 3A may be performed by a BS during initialization. Each other BS in the system may be configured to perform the same method and may recognize communications from the initializing BS when performing the initialization process. In other words, the initializing BS is configured to instruct the other base stations to illuminate beams for measurement purposes by using a distributed algorithm shared by all of the base stations in the system. Moreover, while FIG. 3A is explained with reference to initialization, it should be understood that the BS may perform the method periodically.

At S305, the BS illuminates a first beam at a first time slot. At S310, the BS determines interferences between the first beam and other beams illuminated by other BSs at the first time slot.

Interference levels among different beams is obtained by the BS by collecting channel quality indicators (CQI) from the UEs communicating with the BS. For example, measurements may be performed by sending out training sequences from the BS to UEs and receiving feedback. A training sequence is a sequence of data which is known to the receiver, in this case, the UE.

In other words, the BS may determine the interference level without receiving information from interfering base stations.

Additionally, the BS may exchange information and interference level information with nearby base stations by backhaul, X2 (backbone system), and/or broadcast measurement information. Information reported by the UE may be part of the information exchanged between the BSs in the system.

Each beam has a beam identification (ID) and/or cell ID. The BS deciphers between interfering beams by examining a beam ID of the interfering beam (or cell). As is known, cell/beam IDs are part of a system's configuration. Each cell/beam ID is assigned during an initialization process of the BS.

At S315, the BS determines whether all interferences for the first beam have been measured. The BS is configured to determine whether all interferences for the first beam have been measured based on information exchanged from nearby BSs.

If all interferences have not been measured, then the BS illuminates the first beam at the next time slot at S320. At the next time slot, the other base stations in the system are illuminating different beams than in the first time slot. Consequently, the BS determines the interferences between the first beam and the interfering beams at S310 during the next time slot.

Once all interferences for the first beam have been determined, the BS determines whether all interferences for all of the beams of the BS have been determined at S325. If all interferences for all the beams have not been determined, the BS changes a beam to illuminate at S330. Thus, the BS illuminates a second beam at the first time slot at S305 and repeats steps S310-325 until all interferences for all of the beams of the BS have been determined.

Once all interferences for all of the beams of the BS have been determined, the initial interference determining method ends at S335.

Based on the measurements received from nearby BSs in the system and its own interference measurements, each BS may determine a local extended conflict graph.

Figure 3B:
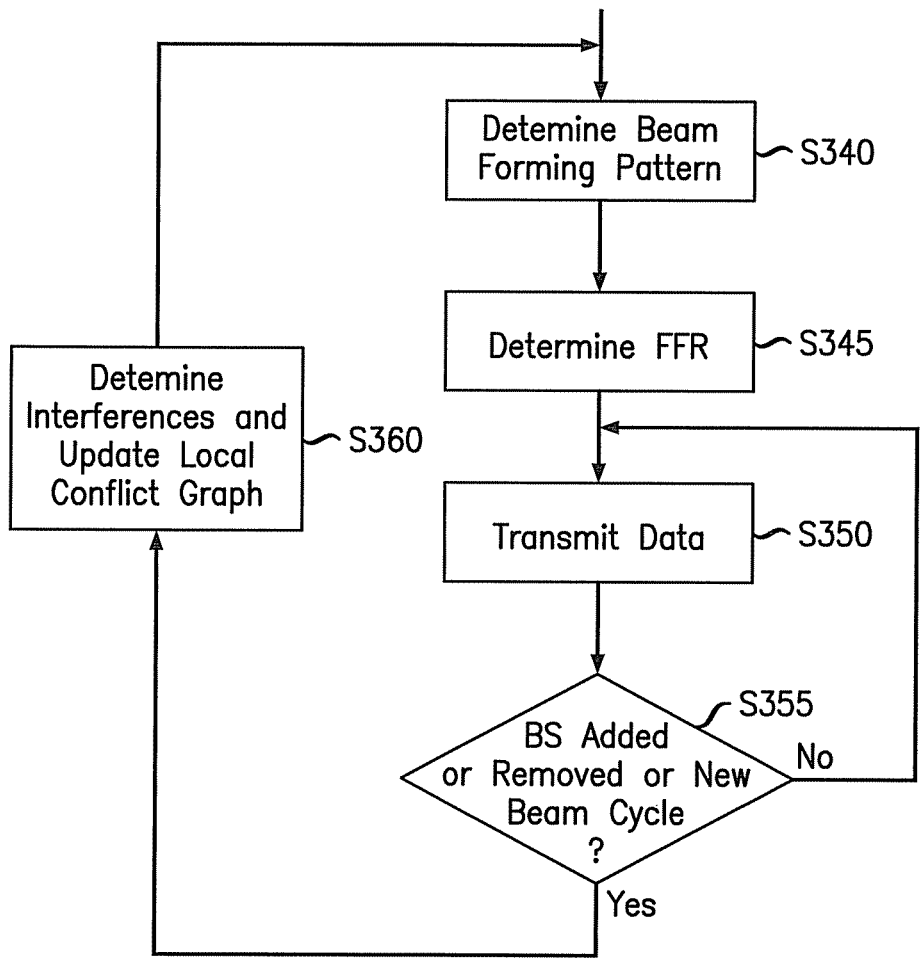
FIG. 3B illustrates a method of reducing interference and generating a conflict graph according to an example embodiment.

FIG. 3B illustrates a method of reducing interference and generating a conflict graph according to an example embodiment. At S340, the BS determines a beam forming pattern based on the interferences determined in the method shown in FIG. 3A.

Figure 3C:
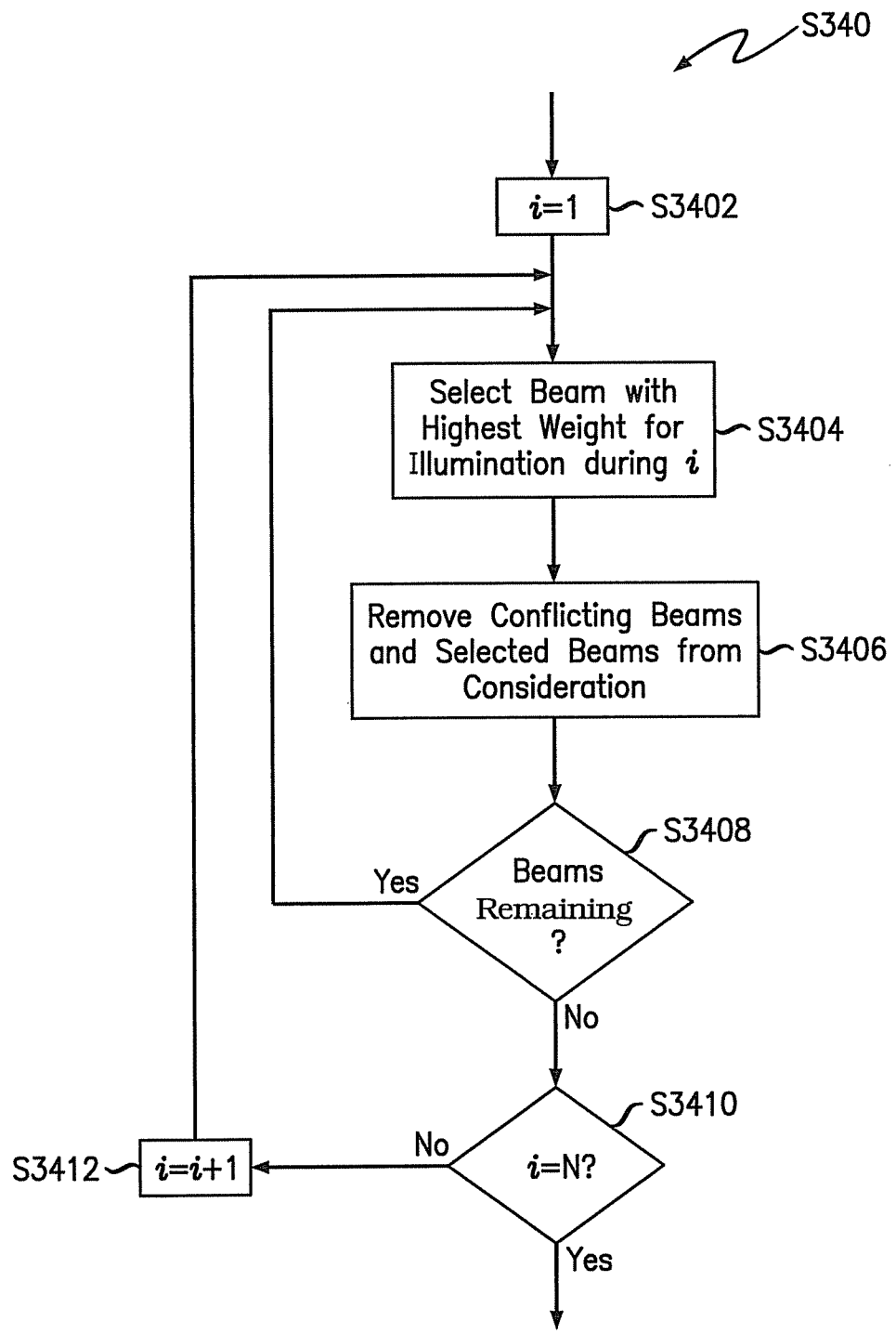
FIG. 3C illustrates a method of determining a beam forming pattern according to an example embodiment.

FIG. 3C illustrates an example embodiment of S340. At S3402, the BS starts at the first time slot. While FIG. 3C is explained with the BS making the determinations, it should be understood that a controller of the system may perform the method of FIG. 3C and transmit a beam forming decision to the BSs in the system or the method of FIG. 3C may be carried out in a distributed manner via nearby BSs.

At S3404, the BS selects a beam with the highest weight for illumination during the first time slot, otherwise, known as implementing a greedy algorithm. By implementing the greedy algorithm, the BS chooses the beam with the highest weight factor. The weight factor of a beam is determined by the base station based on the traffic condition as well as the channel quality. For example, the weight factor may be the product of a length of a queue of data packets in a buffer and a throughput of a wireless channel associated with the beam. Additionally, the weight factor may also be based on a type of user associated with a beam. For example, a beam associated with a user with premium service will be given a higher weight by the base station.

At S3406, the BS determines the beam forming pattern that instructs other BSs to turn off beams that are in conflict with the selected beam with the highest weight when the selected beam with the highest weight is illuminated during the first time slot. Thus, when the selected beam is illuminated (at S350), the beams in conflict are not illuminated. The BS updates the local extended conflict graph to illustrate that the selected beam and the beams are in conflict and, therefore, are connected to a constraint node.

The BS determines that an interfering beam is in conflict if the interference between the beam and the interfering beam exceeds an interference threshold. The interference threshold is a value that is determined based on empirical data and testing before the system is implemented. The threshold may be determined by modulation-coding schemes (MCS) employed by the system as well as characteristics of a wireless channel. The threshold may also be changed after the system has been activated/implemented.

At S3408, the BS determines whether there are any beams remaining that have not been selected or not removed from consideration. If there are beams remaining, the BS selects a remaining beam with the highest weight also for illumination during the first time slot at S3404.

The BS repeats steps S3404-S3408 until there are no beams remaining.

For example, a system includes five BSs with each BS configured to output first and second beams. The first beam of the first BS has the highest weight and is selected for illumination during the first time slot. A second beam of the first BS and first beams of the second and third BSs are in conflict with the first beam of the first BS and are thus, removed from consideration along with the selected beam. Then, the BS selects another beam for illumination during the first time slot from the second beams of the second and third BSs and the first and second beams from the fourth and fifth BSs. The BS repeats this process until there are no beams remaining for consideration in the first time slot.

Once there are no beams remaining, the BS determines whether the time slot is at the end of the beam forming cycle at S3410. The beam forming cycle has N time slots.

If the time slot is not at the end of the beam forming cycle, the BS increments the time slot by one at S3412 and performs S3404-S3410 for the incremented time slot.

The BS is configured to calculate the weight factor for each beam after each time slot. Thus, the weight factor for each beam may change for each time slot. For example, if a beam is selected by the BS for illumination in the preceding time slot, the weight factor of the selected beam decreases because a length of a queue of data decreases (data is transmitted in the preceding time slot).

It should be understood that the base stations in the system communicate with each other. Thus, while FIGS. 3A-3D are explained with one BS performing all the steps, it should be understood that the calculations and determinations are shared with all the BSs within the system. Thus, each BS knows the beam switching pattern and FFR pattern of each BS.

Once the beam forming pattern in complete at S340, the BS determines a FFR pattern at S345, as shown in FIG. 3B.

Figure 3D:
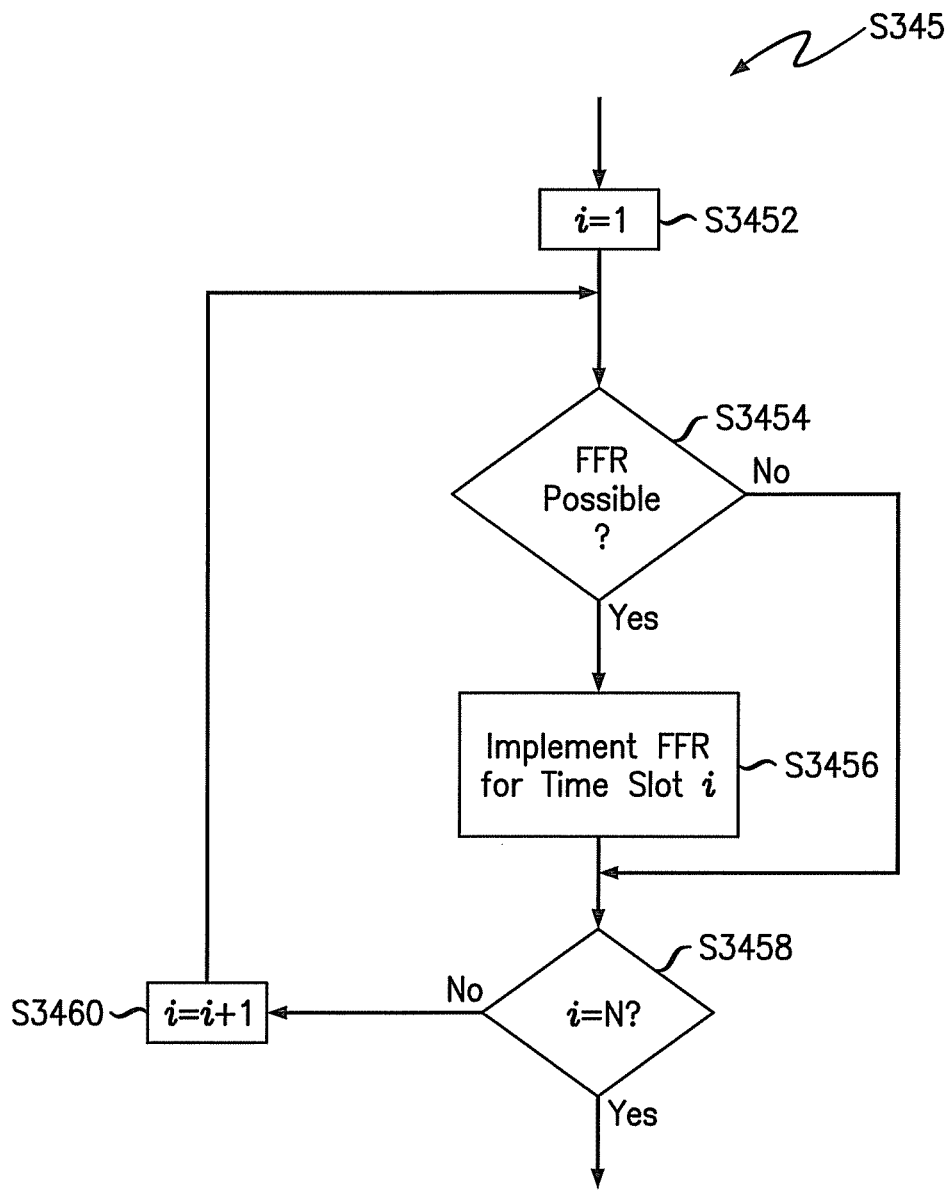
FIG. 3D illustrates a method of determining a FFR pattern according to an example embodiment.

FIG. 3D illustrates an example embodiment of determining a FFR pattern at S345. Each BS in the system determines a FFR pattern. Alternatively, a centralized controller may be configured to determine the FFR pattern and transmit the decision to each BS. If two beams generate strong mutual interference with each other, the base station may use FFR to mitigate the interference, allowing at least two interfering beams to be illuminated.

At S3452, the BS starts the method at the first time slot. At S3454, the BS determines whether FFR is possible with conflicting beams and the selected illuminated beam at the first time slot. As described above, each beam is associated with a weight factor that varies based on the traffic condition as well as the channel quality. Consequently, the weight factor may change if other beams are illuminated at the same time.

For a particular beam, each FFR pattern corresponds to a specific group of sub-bands allocated to the particular beam. The weight may be calculated by the BS as the product of the buffer length of the beam and the sum throughput of the specific group of sub-bands.

Moreover, a beam can only use one of the total three sub-bands, which may be referred to as a first type constraint. Beside this type of constraint, there are two other types of conflicts. A second type constraint depicts the fact that each sub-band can be used by only one beam of the same BS for inter-beam interference avoidance. A third type constraint represents the inter-cell interferences between beams from different BSs with the same sub-band frequency.

The BS determines that FFR is possible if the weight of the illuminated beam when conflicting beams are illuminated plus the weight of the conflicting beams is greater than the weight of the illuminated beam when the conflicting beams are not illuminated. If a combination of beams is subject to one of the three constraints, the BS determines that FFR is not possible.

If FFR is possible, the illuminated beam may occupy one-half of the frequency band and a conflicting beam may occupy the other half. It should be understood that multiple conflicting beams may be illuminated.

For example, the BS may calculate a weight for each beam that is the product of the channel throughput based on feedback from a UE as well as the bandwidth and the queue length of each beam and then divide the bandwidth according to the product. For two conflicting beams, if the weight of the first beam is 2 and the weight of the second beam is 1. If the weight of the first beam being illuminated without conflicting illuminated beams is less than 3, then FFR is implemented. Then the first beam occupies the first ⅔ of the complete bandwidth and the second beam takes the remaining ⅓ of the bandwidth, if FFR is possible. Thus, the bandwidth may be allocated based on the bandwidth.

If FFR is possible at S3454, the BS implements FFR for the time slot at S3456. The BS then determines whether all time slots in the beam forming cycle have been considered at S3458. If FFR is not possible, the method proceeds to S3458.

If all the time slots have not been considered, the BS increments the time slot by one at S3460 and repeats steps S3454-S3458.

If all the time slots have been considered by the BS, then the BS transmits data and illuminates its beams according to the determined beam forming pattern and FFR pattern at S350, as shown in FIG. 3B.

At S355, the BS determines whether a BS has been added or removed or a new beam cycle is reached. If a BS has been added or removed or a new beam cycle is reached, the BS determines interferences again and updates its local extended conflict graph accordingly at S360. The BS then transmits its local extended conflict graph to the BSs in the system. The BSs are then able to update the complete conflict graph based on the received updated local extended conflict graphs. S360 may be the same as the method illustrated in FIG. 3A.

Figure 4A:
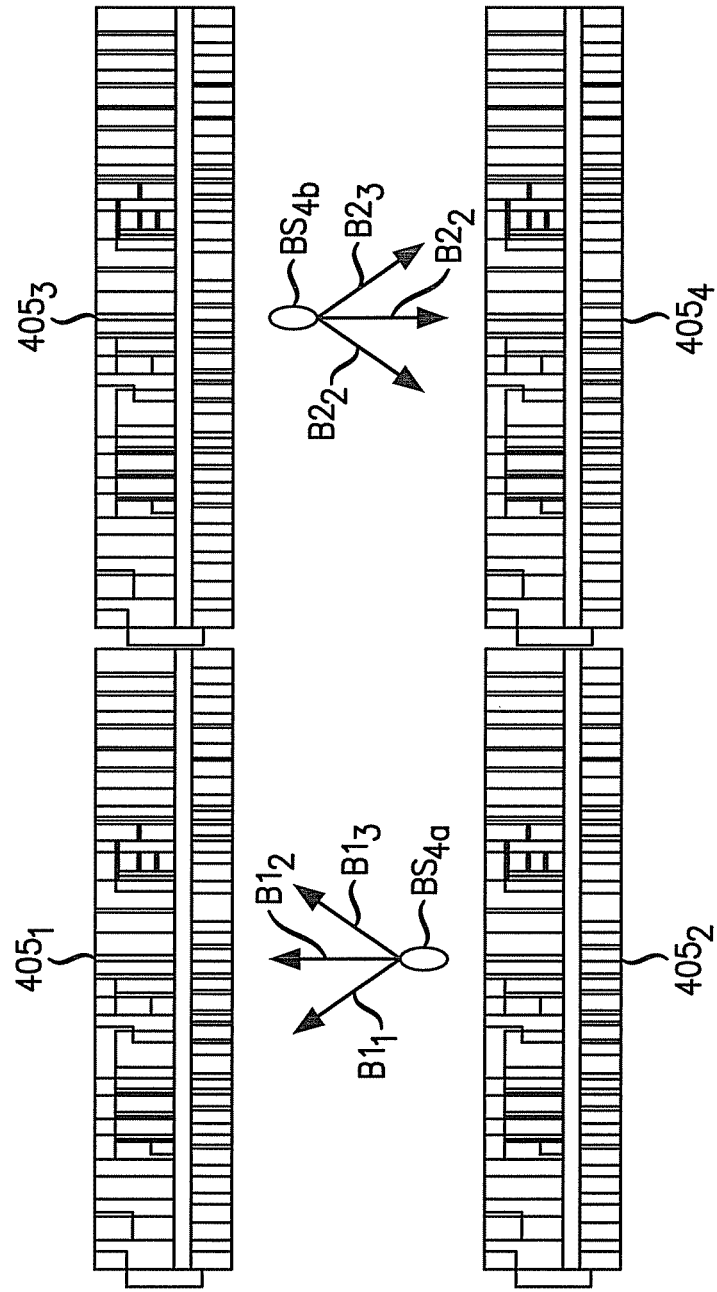
FIG. 4A illustrates two base stations configured to transmit beams to user equipment (UEs) according to an example embodiment.

As an example of the method of FIGS. 3A-3D, FIG. 4A illustrates two base stations $BS_{4a}$ and $BS_{4b}$ configured to transmit beams to UEs in buildings $405_1$-$405_4$. In FIG. 4A, each of the base stations $BS_{4a}$ and $BS_{4b}$ have already determined their respective beam switching pattern using the method of FIG. 3C.

The base station $BS_{4a}$ is configured to transmit a plurality of beams $B1_x$, where x represents a number of the transmitted beam. The base station $BS_{4b}$ is configured to transmit a plurality of beams $B2_w$, where w represents a number of the transmitted beam. Each of the plurality of beams $B1_x$ and $B2_w$ can be transmitted at any frequency band used for communications. Non-overlapping frequency sub-bands are allocated to different beams of the same base station to avoid inter-beam interference.

Interference levels among different beams are obtained by the base stations $BS_{4a}$ and $BS_{4b}$ by collecting channel quality indicators (CQI) from the UEs communicating with the base stations $BS_{4a}$ and $BS_{4b}$, using the method of FIG. 3A.

Based on whether the interference levels exceed the interference threshold and whether beams are subject to the three constraints described above, a constraint node is generated in the conflict graph. For example, if the measured interference level for beam $B_1$ and $B_2$ exceed the interference threshold at a frequency sub-band, a constraint node is generated in the conflict graphs for the base stations $BS_{4a}$ and $BS_{4b}$.

Figure 4B:
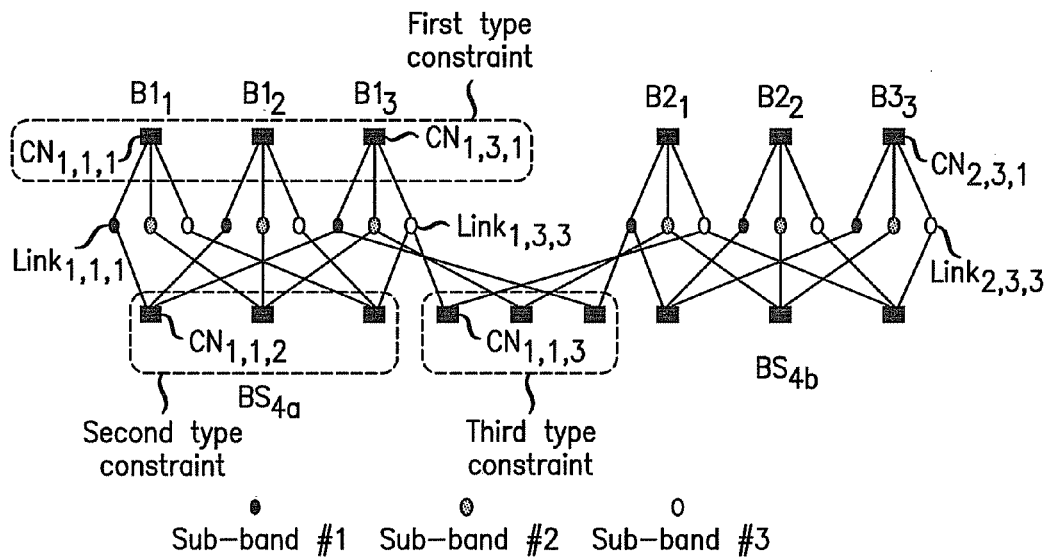
FIGS. 4B-4C illustrate conflict graphs according to an example embodiment.
Figure 4C:
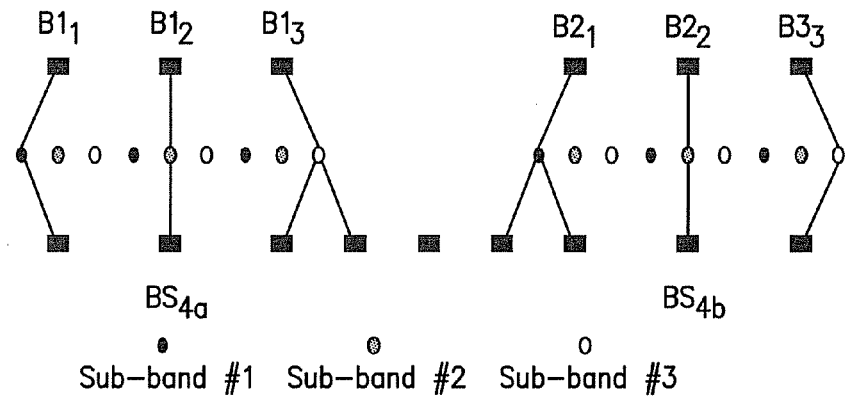

For example, FIGS. 4B-4C illustrates a complete conflict graph generated by the base station $BS_{4a}$ in FIG. 4A. The base station $BS_{4a}$ is configured to generate the complete conflict graph based on its local extended conflict graph and the local extended conflict graph received from the base station $BS_{4b}$.

As shown in FIGS. 4B-4C, each circle corresponds to a specific wireless link $Link_{t,y,z}$, i.e., one beam (antenna) using a sub-band frequency for the data transmission, where t is the BS, y is the beam, and z is the sub-band. For example, the first circle represents $Link_{1,1,1}$ which a first sub-band is used by the first beam ($B1_1$) of the first BS ($BS_{4a}$).

Each rectangular node denotes a constraint (conflict) $CN_{t,y,v}$ between multiple wireless links, where v represents the type of constraint. In FIG. 4B, the beam B11 can only use one of the total three sub-bands, which is represented by the first rectangular node in the first row ($CN_{1,1,1}$). This may be considered a first type constraint. Beside this type of constraint, there are two other types of conflicts in this example. A second type constraint depicts the fact that each sub-band can be used by only one beam of the same BS for inter-beam interference avoidance. A third type constraint represents the inter-cell interferences between beams from different BSs.

Using a beam forming pattern and FFR pattern determined using the method of FIGS. 3A-3D, the base station $BS_{4a}$ may generate a simplified conflict graph shown in FIG. 4C.

Figure 4D:
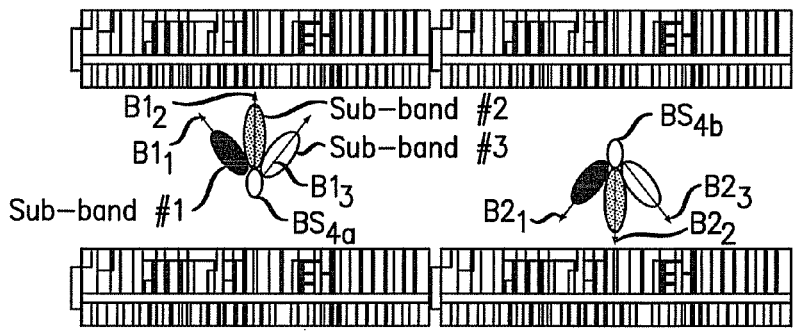
FIG. 4D illustrates beam switching and FFR scheme according to an example embodiment.

Here, the circle node connected with an arc shows that the corresponding wireless link is active; while other wireless links corresponding to non-connected circle nodes are turned off. In FIG. 4C, each constraint (rectangular) node is connected to at most one variable (circle) node, which shows there is no conflict between active wireless links. Finally, FIG. 4D illustrates the obtained frequency reuse patterns used by the base stations $BS_{4a}$ and $BS_{4b}$.

Figure 5:
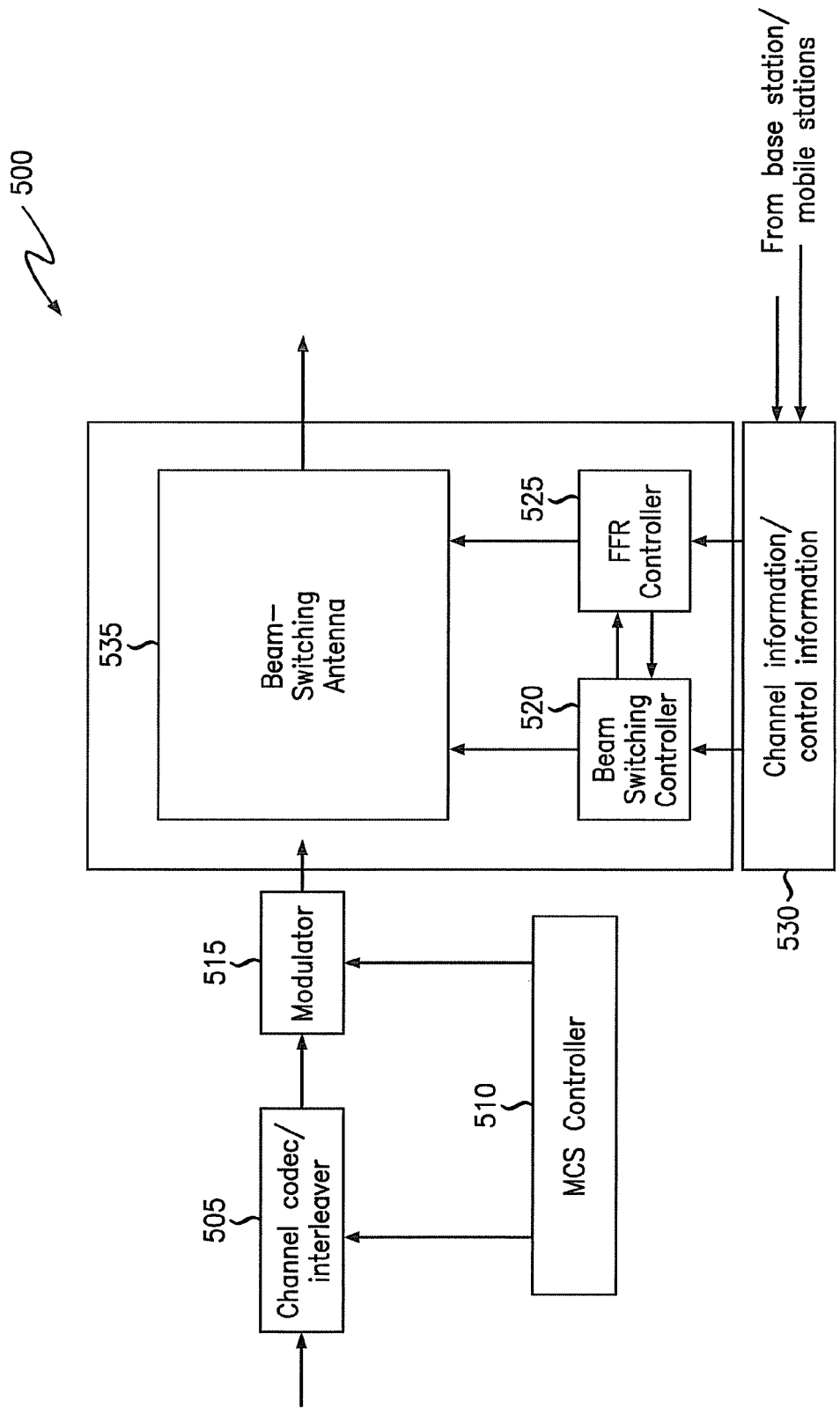

FIG. 5 illustrates a transmitter included in the base station $BS_{4a}$ according to an example embodiment. While the transmitter 500 is illustrated as being implemented in the base station $BS_{4a}$, it should be understood that the transmitter 500 may be included in all base stations. Moreover, it should be understood that the transmitter 500 may include additional features than those shown in FIG. 5.

A channel code/interleaver 505 of the transmitter 500 is configured to receive data to be transmitted. The transmitter 500 further includes an MCS (modulation and coding scheme) controller 510, a modulator 515, a beam switching controller 520, a FFR controller 525, a channel information/control information processor 530 and a beam-switching antenna (omni-directional) 535.

The MCS controller 510 is configured to output MCS data to the channel codec/interleaver 505 and the modulator 515 based on an output received from the channel information/control information processor 530. The channel information/control information processor 530 receives feedback data from the beam switching controller 520, FFR controller 525, as well as channel information/control information from other base stations and mobile stations.

The channel code/interleaver 505, MCS controller 510, modulator 515, channel information/control information processor 530 and beam-switching antenna 535 are known, and therefore, a further description of these features is omitted.

Based on the channel information and control information (two types of information used to determine the local extended conflict graph for each BS) received from the channel information/control information processor 530, the beam switching controller 520 and the FFR controller 525 determine a beam sequence and frequency bands using the extended conflict graph approach described above.

Compared with the traditional FFR pattern with omni-directional antenna, example embodiments combine the strengths of beam switching, FFR and conflict graphs based techniques in a unified framework to fully utilize the spatial-frequency diversity.

Conflict-graphs according to example embodiments model the inter-cell interference between neighboring BSs, which not only provides a simple and unified framework to characterize the conflict of wireless links within a wireless system such as a wireless small-cell system, but also facilitates the design of an efficient, robust and low complexity beam switching algorithm to improve the overall system performance (e.g. spectral efficiency, system/users throughput). Also, the conflict graph based approach is flexible and dynamically adaptive, and allow multiple beams to be illuminated simultaneously.

In example embodiments, FFR pattern may be used in conjunction with the coordinated beam switching to further mitigate the interference. By allocating orthogonal frequency bands to users associated with conflicting beams, the interference can be either completely avoided or significantly suppressed.

In at least one example embodiment, each BS broadcasts, from time to time, its beam switching sequence, locally to its neighboring base stations. For instance a BS can use either a fraction of a resource unit or one or more resource units (e.g. Radio Block in LTE) to broadcast this information. In addition, the beam switching sequence can be communicated in differential format. Furthermore, since for indoor applications a radio channel is quasi-static and slow time-varying, the message overhead is low.

Additionally, only require infrequent feedbacks from the mobile stations may be utilized by the base stations. For example, in the LTE standard, one frame of data bits spans 1 ms of time duration. The typical coherence time for such a small cell system could be as high as 200 ms, which equals to 200 frames of data bits. If we assume each beam spans 10 LTE frames and there are 4 beams within each cycle, one feedback of the channel quality from the mobile stations within each 5 beam switching cycles is sufficient.

As described above, each base station is equipped with a decentralized algorithm capable to compute a beam switching pattern based on system dynamics such as evolution of traffic and/or users mobility as well as based on beam switching patterns of other base stations. Therefore, the beam switching mechanism according to example embodiments adapts to various scenarios which include type of topology/buildings, nature of scattering environments, traffic non-uniformity, users mobility and traffic & interference evolution with time.

BSs participating in the collaboration form a cluster. Each BS within this cluster does not need to know the configurations of other BSs such as the number of antennas, etc. Further BSs within a cluster do not need to know anything about BSs outside the cluster.

Additionally, no packet level synchronization is required in the FFR scheme. Example embodiments assume synchronize at the beam level.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of reducing interference in a communication system, the method comprising:
    first determining, by a first transmitter having a multi-directional antenna configured to produce a plurality of beams, at least one interference level of at least one interfering beam of a plurality of beams of at least one interfering transmitter in the communication system;
    second determining a transmitting beam pattern based on the interference level, the transmitting beam pattern indicating a sequence of illuminating the plurality of beams at corresponding time slots, the second determining including, determining the transmitting beam pattern based on a weight factor for the plurality of beams and the at least one interfering beam, and selecting a first beam of the plurality beams and the at least one interfering beam based on the weight factor for illumination during the first time slot, the selected first beam having the highest weight factor;

third determining a fractional frequency reuse pattern based on the transmitting beam pattern; and transmitting data based on the transmitting beam pattern and the frequency reuse pattern.

2. The method of claim 1, wherein
the first transmitter is in a base station, and
the first determining determines the interference level without receiving information from the at least one interfering transmitter.

3. The method of claim 2, wherein the first determining includes,
receiving channel quality indicators from mobile stations in the communication system, the interference level being based on the channel quality indicators.

4. The method of claim 1, wherein the first determining includes,
receiving channel quality indicators from mobile stations in the communication system, the interference level being based on the channel quality indicators.

5. The method of claim 1, wherein the second determining includes,
second determining the transmitting beam pattern in the first time slot by generating a conflict graph, the conflict graph representing interferences between the plurality of beams of the first transmitter and the plurality of beams of the at least one interfering transmitter.

6. The method of claim 1, wherein the first determining includes,
receiving, from the interfering transmitter, information indicating a beam switching pattern for the interfering transmitter.

7. The method of claim 1, wherein
the first transmitter is in a base station, and
the first determining determines the interference level by receiving a broadcast from the interfering transmitter, the interfering transmitter being in an interfering base station.

8. The method of claim 1, wherein the third determining the fractional frequency reuse pattern includes,
allocating an orthogonal frequency to the interfering transmitter based on the interference level.

9. The method of claim 1, wherein the third determining includes,
determining a first local extended conflict graph based information received from user equipments (UE), the first local extended conflict graph representing interferences between the plurality of beams of the first transmitter and a plurality of beams of the at least one interfering transmitter, and
determining the fractional frequency reuse pattern based on the first local extended conflict graph.

10. The method of claim 9, wherein the third determining includes,
receiving a second local extended conflict graph from the at least one interfering transmitter, the second local extended conflict graph representing interferences between the plurality of beams of the at least one interfering transmitter and a plurality of beams of transmitters interfering with the at least one interfering transmitter, and
determining the fractional frequency reuse pattern based on the second local extended conflict graph.

11. The method of claim 9, wherein the third determining includes,
determining an extended conflict graph based on the first and second local extended conflict graphs, the extended conflict graph identifying sub-band frequencies associated with each of the plurality of beams of the first transmitter and the plurality of beams of the at least one interfering transmitter.

12. The method of claim 1, wherein the second determining includes,
determining conflict beams based on the at least one interference level, and
selecting a second beam to be illuminated during the first time slot, the selected second beam not being the selected first beam or one of the conflict beams.

* * * * *